Figure 1:
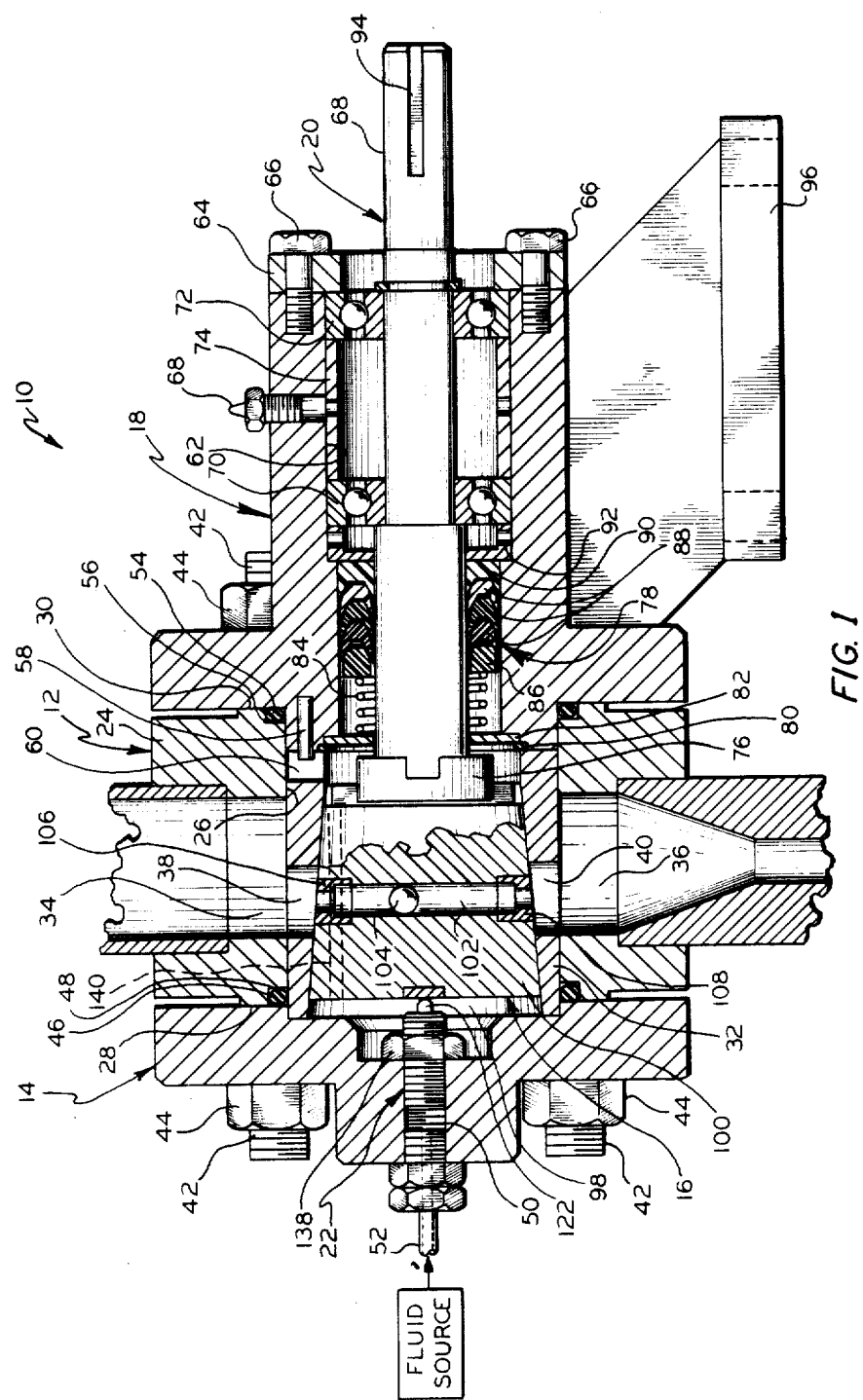

United States Patent [19]

Rohlfing et al.

[11] Patent Number: 4,501,286

[45] Date of Patent: Feb. 26, 1985

[54] ROTARY VALVE

[75] Inventors: Raymond G. Rohlfing; Laura A. Martin, both of Bartlesville, Okla.

[73] Assignee: Phillips Petroleum Company, Bartlesville, Okla.

[21] Appl. No.: 459,298

[22] Filed: Jan. 20, 1983

[51] Int. Cl.³ .............................. F16K 5/22; B08B 3/04
[52] U.S. Cl. ...................................... 137/15; 137/240; 137/246.22; 222/368; 406/63; 414/219
[58] Field of Search ............ 137/240, 15, 246, 246.22; 198/723; 222/368; 252/11; 406/63, 64, 65, 66, 67, 68; 414/219, 220

[56] References Cited

U.S. PATENT DOCUMENTS

| | | | |
|---|---|---|---|
| 1,696,726 | 12/1928 | Nordstrom | 137/246.22 |
| 2,278,819 | 4/1942 | Gredell | 299/34 |
| 2,885,246 | 5/1959 | De Haven | 406/68 |
| 3,139,996 | 7/1964 | Welty | 214/17 |
| 3,167,398 | 1/1965 | Whittington | 23/285 |
| 3,219,208 | 11/1965 | Hadley et al. | 214/17 |
| 3,559,678 | 2/1971 | Donner | 137/535 |
| 3,665,957 | 5/1972 | Fulmer et al. | 137/509 |
| 4,325,837 | 4/1982 | Capshew et al. | 252/429 B |

OTHER PUBLICATIONS

Operating and Maintenance Instructions AP-150 Double Check Feeder Valve, Seiscor Division, Seismograph Service Corporation.

*Primary Examiner*—George L. Walton
*Attorney, Agent, or Firm*—French and Doescher

[57] ABSTRACT

A valve structure including a valve body defining a valve chamber with a tapered bearing surface and a tapered valve member journaled in the tapered bearing surface. A spring-biased plunger mechanism constantly urges the valve member into slidable sealing engagement with the tapered bearing surface. A passage communicates between the valve chamber and the exterior of the valve body via the spring-biased plunger mechanism and is connected in fluid flow communication with a source of suitable fluid, whereby such fluid passes from the source into the valve chamber via the spring-biased plunger mechanism.

23 Claims, 2 Drawing Figures

ROTARY VALVE

The present invention relates generally to apparatus for controlling the flow of material. In one aspect the invention relates to an improved valve for controlling the flow of material therethrough. In another aspect the invention relates to a feeder for controlling the flow of material therethrough. A more specific aspect of the invention relates to the feeding of particulate catalyst to a catalytic reactor system.

The apparatus of the present invention is an improvement over the valve or feeder mechanisms disclosed in U.S. Pat. Nos. 3,219,208 and 3,139,996. Particulate catalyst, such as chromium oxide deposited on silica or silica-alumina, a relatively abrasive, and it has been found that feeder mechanisms for such catalyst are subject to undesirable wear between the rotary valve plug or rotor and the valve body in which the valve plug or rotor is carried. Such wear can cause both leakage of catalyst into the valve chamber through spaces worn between the valve plug or rotor and the valve body and increased operating torque required to rotate the valve plug or rotor relative to the valve body. In feeder mechanisms employing a tapered valve plug which is spring-biased into slidable sealing engagement with a corresponding tapered surface in the valve body, it has been found that the spring-biasing mechanism can become fouled or otherwise adversely affected by the catalyst which leaks into the valve chamber and contacts the spring-biasing mechanism.

The present invention contemplates a valve for controlling the passage of material therethrough. The valve comprises a valve body defining a valve chamber having a frustoconically shaped bearing surface and having an inlet port and an outlet port, with each of the ports communicating between the valve chamber and the exterior of the valve body. A valve member having a frustoconically shaped outer surface and first and second opposite ends is disposed within the valve chamber and is closely received within the valve chamber in slidable sealing engagement with the bearing surface. The valve is further provided with drive means drivingly secured to the valve member for rotating the valve member about its longitudinal axis within the valve chamber. Force is applied to the second opposite end of the valve member by biasing means carried by the valve body to urge the valve member into slidable sealing engagement with the bearing surface of the valve chamber. The valve body is further provided with passage means in the valve body communicating between the valve chamber and the exterior of the valve body via the biasing means. The valve additionally includes means in fluid flow communication between the passage means and a source of fluid whereby fluid from the source flows through the passage means via the biasing means into the valve chamber so as to prevent the entrance of foreign matter into the biasing means from the valve chamber.

Accordingly, it is an object of the present invention to provide apparatus which overcomes the deficiencies of previous feeder mechanisms.

Another object of the invention is to provide a valve structure which overcomes the problem of material leakage between the valve member and the valve body.

Yet another object of the invention is to provide a valve structure suitable for controlling the feeding of particulate material.

Still another object of the invention is to provide a valve structure wherein torque required to rotate the valve member relative to the valve body is minimized.

Another object of the invention is to provide a valve structure suitable for controlling the feeding of abrasive particulate material which minimizes abrasive wear between the valve member and the valve body.

Yet another object of the invention is to provide a valve structure which is simple and economical in construction and operation.

Figure 2:
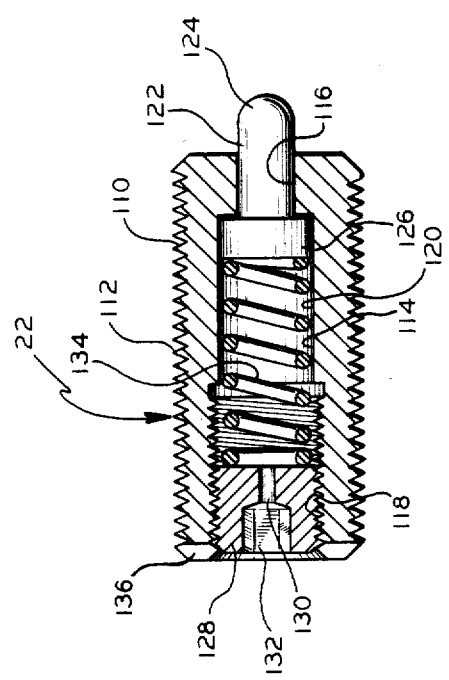

Other objects, aspects and advantages of the invention will be evident from the following detailed description when read in conjunction with the accompanying drawings in which:

FIG. 1 is a vertical cross-sectional view taken along the longitudinal center line of a feeder valve structure constructed in accordance with the present invention; and FIG. 2 is an enlarged cross-sectional view of the valve member biasing assembly of the valve structure of FIG. 1.

Referring now to the drawing, apparatus for controlling the flow of material therethrough constructed in accordance with the present invention is illustrated therein and is generally designated by the reference character 10. The apparatus 10 comprises a valve body assembly 12, an end flange assembly or cap 14, a valve member assembly 16, a packing and bearing gland and flange assembly 18, a drive shaft assembly 20, and a valve member biasing assembly 22.

The valve body assembly comprises a valve body member 24 having a longitudinal passage 26 extending therethrough and communicating with opposite end faces 28 and 30 on the valve member 24. The valve body assembly further includes a wear liner or insert 32 closely received within the longitudinal passage 26. The wear liner 32 is provided with a tapered or frustoconically shaped longitudinal inner surface which converges toward the end face 30 of the valve body member 24. The valve body member 24 is provided with an inlet port 34 and an outlet port 36 which are in registration with corresponding inlet and outlet ports 38 and 40, respectively, formed in the wear liner 32.

The end flange assembly 14 is secured to the end face 28 of the valve body member 24 by suitable means such as threaded studs 42 and threaded nuts 44. A suitable seal is provided between the end flange assembly 14 and the valve body member 24 by means of an annular seal 46, such as an O-ring, carried in a corresponding annular groove 48 in the valve body member 24. The end flange assembly 14 is provided with a longitudinal passage 50 extending therethrough, which longitudinal passage is preferably coaxially aligned with the axis of the longitudinal passage 26 and the axis of the frustoconically shaped inner surface of the wear liner 32 of the valve body assembly 12. The longitudinal passage 50 is internally threaded thus providing means for mounting the valve member biasing assembly 22 therein as well as providing means for connecting the longitudinal passage in fluid flow communication with a suitable conduit 52 which is in turn connected to a source of suitable fluid, preferably a liquid lubricant such as mineral oil or some other suitable liquid hydrocarbon.

The packing and bearing gland end flange assembly 18 is secured to the opposite end face 30 of the valve body member 24 by suitable means such as threaded studs 42 and threaded nuts 44. A suitable fluid-tight seal is provided between the end flange assembly 18 and the valve body member 24 by means of a suitable annular seal 54, such as an O-ring, which annular seal is carried in a corresponding annular groove 56 in the valve body member 24. The end flange assembly 18 is provided with a pin 58 which extends outwardly therefrom into the longitudinal passage 26 of the valve body member 24 and is received in a corresponding recess 60 in the wear liner 32 to prevent the wear liner 32 from rotating within the longitudinal passage 26 and thereby maintain registration between the inlet and outlet ports of the wear liner and the valve body member 24. The end flange assembly 18 is provided with a longitudinal passage 62 extending the full length thereof and coaxially aligned with the longitudinal passages 26 and 50 of the valve body member 24 and the end flange assembly 14. The end flange assembly 18 is further provided with a bearing end cap 64 which is secured to the outer end of the end flange assembly 18 by suitable means such as threaded cap screws 66. The bearing end cap 64 provides means for retaining the drive shaft assembly 20 within the longitudinal passage 62 of the end flange assembly 18. The end flange assembly 18 is suitably provided with a lubricating fitting 68 which provides means for applying lubricant to the bearings of the drive shaft assembly 20 within the longitudinal passage 62.

The drive shaft assembly 20 comprises a drive shaft 68 journaled within the longitudinal passage 62 by means of a pair of ball bearings 70 and 72, which bearings are separated by a cylindrical bearing spacer 74. The inner end portion of the drive shaft 68 is drivingly secured to the valve member assembly 16 by means of a suitable coupling 76, such as an Oldham type coupling. A rotating seal is provided between the inner end portion of the drive shaft 68 by means of a suitable packing assembly 78. The packing assembly 78 comprises a retainer ring 80, a spring-engaging washer 82 and a compression coil spring 84, a male packing adapter 86, three packing rings 88, a female packing ring 90, and a backup ring 92. The outer end portion of the drive shaft 68 is provided with suitable means, such as a key slot 94, for drivingly connecting the drive shaft 68 to suitable drive means, such as an electric drive motor (not shown) which can be actuated by suitable control means (not shown) to rotate the drive shaft through a predetermined amount of rotation at predetermined times.

The packing and bearing gland end flange assembly 18 is preferably provided with a mounting bracket 96 which provide suitable means for supporting the apparatus 10 in any desired operating position.

The valve body assembly 12, end flange assembly 14, end flange assembly 18, and drive shaft assembly 20, assembled as described above, form a housing which defines a valve chamber 98 within which the valve member assembly 16 is disposed. The valve member assembly 16 comprises a tapered valve plug 100 in the form a truncated cone or a frustrum of a cone. This frustoconically shaped valve plug 100 is sized and shaped to be closely received within the frustoconically shaped inner surface of the wear liner 32 in slidable sealing engagement therewith. The valve plug 100 is provided with a transverse bore 102 which extends through and provides a valve port or cavity which provides means for communicating between the inlet and outlet ports 38 and 40 of the wear liner 32. A solid spherical member 104 is disposed within the bore 102 and is free to move therein. The spherical member 104 is retained as a check valve member within the bore 102 by means of a pair of check valve seats 106 and 108 fixedly secured in the opposite ends of the bore 102. The check valve seats provide sealing engagement with the spherical member 104 when engaged by the spherical member 104 with a suitable amount of differential pressure thereacross. When the valve member assembly 16 is rotated by the drive shaft 68, the openings in the valve port or cavity communicating with the tapered outer surface of the valve plug 100 revolve and define an annular path which communicates with the inlet port 38 and the outlet port 40.

The valve member biasing assembly 22, as best shown in FIG. 2, comprises a tubular outer member 110 having external threads 112 extending the full length thereof. A longitudinal passage 114 extends through the full length of the tubular outer member 110 and is characterized by a radially inwardly extending annular shoulder 116 at the first end portion thereof and an internally threaded portion 118 at the second end portion thereof. A generally cylindrical portion 120 extends between the shoulder 116 and the internally threaded portion 118. A plunger 122 having first and second opposite end portions 124 and 126, is positioned within the first end portion of the longitudinal passage 114 with the first end portion 124 of the plunger 122 extending beyond the first end portion of the longitudinal passage, and with the second end portion 126 of the plunger 122 disposed intermediate the annular shoulder 116 and the internally threaded portion 118 of the longitudinal passage 114. The second end portion 126 of the plunger 122 is characterized by a radially outwardly extending circumferential shoulder which is adapted to abuttingly engage the radially inwardly extending annular shoulder 116 of the outer member 110 to retain the plunger 122 therein. The first end portion 124 of the plunger 122 is preferably hemispherically shaped and surface hardened.

The valve member biasing assembly 22 is further provided with an externally threaded member 128 which is threadedly secured within the internally threaded portion 118 of the tubular outer member 110. The threaded member 128 is provided with a longitudinal passage 130 therethrough which preferably includes a hexagonally shaped recess 132 in the outer end portion thereof which provides means for receiving an Allen wrench therein to facilitate threaded engagement between the threaded member 128 and the outer member 110.

A compression coil spring 134 is disposed within the longitudinal passage 114 of the tubular member 110 intermediate the plunger 122 and the externally threaded member 128. The compression coil spring 134 provides constant biasing action urging the plunger 122 to the right as view in FIGS. 1 and 2. The externally threaded member 128 provides means for adjusting the biasing force provided by the compression coil spring 134 through convenient threaded adjustment of the externally threaded member 128 relative to the internally threaded portion 118 of the longitudinal passage 114.

The tubular outer member 110 is preferably provided with a transverse groove 136 formed in the outer end face of the second end portion of the tubular outer member 110 to provide means for receiving a suitable spanner wrench or flat screwdriver blade to adjust and maintain the position of the externally threaded tubular outer member 110 within the internally threaded portion of the longitudinal passage 50 of the end flange assembly 14, as best shown in FIG. 1. As also shown in FIG. 1, an internally threaded nut 138 is threadedly engageable on the external threads 112 of the tubular outer member 110 to secure the tubular outer member 110 to the end flange assembly 14 when suitable threaded adjustment of the tubular outer member 110 relatively to the end flange assembly 114 has been achieved.

It will be seen in FIG. 1 that the first end portion 124 of the plunger 122 abuttingly engages the outer end face of the valve plug 100. It will be understood that when the valve plug 100 is so engaged by the plunger 122 during assembly of the apparatus 10, the plunger is moved to the left, as viewed in FIGS. 1 and 2, relative to the tubular outer member 110 thus further compressing the compression coil spring 134. The constant force provided by the compression coil spring 134 is supplied to the valve plug 100 through the plunger 122 to urge the valve plug 100 to the right, as viewed in FIGS. 1 and 2, and maintain the valve plug 100 in slidable sealing engagement with the tapered wear liner or insert 32 of the valve body assembly 12.

In operation, the apparatus 10 can be advantageously employed in a system for automatically feeding precisely controlled amounts of particulate catalyst to a continuous catalytic reaction. Such a process employing automatic catalyst feeding is disclosed in U.S. Pat. No. 3,219,208, the disclosure of which is incorporated herein by reference. During such operation of the apparatus 10, a suitable lubricating fluid is provided from a suitable fluid source at a suitable pressure via conduit 52 through the longitudinal passage 50 of the end flange assembly 14 and through the longitudinal passage 130 in the threaded member 128 and the longitudinal passage 114 of the tubular outer member 110 of the valve member biasing assembly 22. Such lubricating fluid is provided at a pressure sufficient to overcome the working pressure applied to the valve member assembly 16 so that the lubricating fluid provides lubricating action between the valve plug 100 and the wear liner or insert 32. Suitable lubricating fluids include, but are not limited to, hydrocarbons employed in the polymerization process, e.g., isobutane, isopentane, cyclohexane or mixtures of any two or more thereof, or a non-poisonous lubricating oil, e.g. pump seal mineral oil, to both prevent catalyst entry into the valve member biasing assembly 22 and to reduce friction and abrasive wear between the valve plug 100 and wear liner or insert 32 to thus substantially reduce the required valve operating torque and greatly prolong the operating life of the apparatus 10. A suitable rate of introduction of mineral oil has been found to be about three drops of mineral oil per minute. It will be understood that the lubricating fluid will pass from the longitudinal passage 114 of the tubular outer member 110 into the valve chamber 98 via the annular clearance between the plunger 122 and the tubular outer member 110, which annular clearance is sufficient for this purpose.

While the apparatus 10 is advantageously employable for the automatic control of the feeding of catalyst to a catalytic reaction, it will be understood that the apparatus structure herein disclosed can also be advantageously employed in the construction of tapered plug valves used in other applications. A significant advantage provided by the apparatus 10 is its capacity to maintain a constant, low-friction sliding sealing engagement between the tapered valve plug and the corresponding tapered wear liner which is extremely advantageous in the handling of both liquids and particulate solids, especially when such liquids or particulate solids are particularly abrasive. Under certain circumstances it may be desirable to provide a longitudinal passage 140 in the valve plug 100 communicating between the opposite end faces thereof. The passage 140 provides means for equalizing the pressure of the lubricating fluid across the valve plug 100 and facilitating lubrication of the valve plug 100 and the packing assembly 78. More than one such passage 140 can be employed if desired.

From the foregoing detailed description of the apparatus of the present invention, it will be seen that the apparatus effectively overcomes the deficiencies of similar prior art devices and provides significant advantages thereover. It will be further understood that the present invention can be advantageously employed in feeding the catalysts disclosed in U.S. Pat. No. 4,325,837, the disclosure of which is incorporated herein by reference. Changes may be made in the combination and arrangement of parts or elements as heretofore set forth in the specification and shown in the drawings without departing from the spirit and scope of the invention as defined in the following claims.

That which is claimed:

1. A valve for controlling the passage of material therethrough, comprising:

valve body means defining a valve chamber having a frustoconically shaped bearing surface and having an inlet port and an outlet port, each of said ports communicating between said valve chamber and the exterior of said valve body means;

valve member means for controlling the passage of material through said valve body means, said valve member means having a frustoconically shaped outer surface and first and second opposite ends, said valve member means being disposed within said valve chamber and being sized and shaped to be closely received within said valve chamber with its frustoconically shaped outer surface in slidable sealing engagement with the frustoconically shaped bearing surface of said valve chamber, said valve member being adapted to rotate about its longitudinal axis within said valve chamber;

drive means drivingly secured to the first end of said valve member means for rotating said valve member means about its longitudinal axis within said valve chamber;

biasing means carried by said valve body means for applying force to the opposite second end of said valve member means to urge the frustoconically shaped outer surface of said valve member means into slidable sealing engagement with the frustoconically shaped bearing surface of said valve chamber;

passage means in said valve body means communicating between said valve chamber and the exterior of said valve body means with said biasing means interposed in said passage means; and means in fluid flow communication between said passage means and a source of circulating flushing fluid whereby the fluid from said source flows through said passage means via said biasing means into said valve chamber so as to prevent the entrance of foreign matter into and the accumulation of foreign matter in said valve chamber and said biasing means.

2. A valve in accordance with claim 1 wherein said biasing means is characterized further to include:

plunger means movably disposed within said passage means for longitudinal movement generally in alignment with the axis of rotation of said valve member means; and spring means engaging said plunger means and continuously biasing said plunger means into operative engagement with said valve member means for holding said valve member means in slidable sealing engagement with the frustoconically shaped bearing surface of said valve chamber.

3. A valve in accordance with claim 2 wherein said fluid is a liquid lubricant.

4. A valve in accordance with claim 1 wherein said fluid is a liquid lubricant.

5. A valve in accordance with claim 1 wherein said passage means includes an internally threaded portion and said biasing means comprises:

a tubular outer member having external threads and a longitudinal passage therethrough having first and second opposite end portions, said tubular outer member being threadedly engaged with the internally threaded portion of said passage means;

compression spring means having first and second opposite end portions and disposed within said longitudinal passage intermediate the first and second opposite end portions of said longitudinal passage; and plunger means having first and second opposite end portions disposed within the first end portion of said longitudinal passage and adapted for longitudinal movement therein, the first end portion of said plunger means extending beyond the first end portion of said longitudinal passage and being operatively engageable with said valve member means for holding said valve member means in slidable sealing engagement with the frustoconically shaped bearing surface of said valve chamber.

6. A valve in accordance with claim 5 wherein said bearing means is characterized further to include:

spring engaging means engaging the second end of said compression spring means for compressing said compression spring means so that said thus compressed spring means operatively engages and continuously urges said plunger means into operative engagement with said valve member means.

7. A valve in accordance with claim 6 wherein said biasing means is characterized further to include plunger retaining means carried by said tubular outer member adjacent the first end portion of said longitudinal passage therethrough and operatively engageable with the second end portion of said plunger means for retaining the second end portion of said plunger means within said longitudinal passage against the urging of said compression spring means.

8. A valve in accordance with claim 7 wherein said spring engaging means is characterized further to include:

an externally threaded member threadedly engaged with corresponding internal threads within the second end portion of said longitudinal passage, said externally threaded member having a longitudinal port extending therethrough.

9. A feeder for controlling the flow of material therethrough, comprising:

a shaft having on one end thereof a coaxial truncated conical rotor, and at least one cavity in said rotor intermediate its ends for receiving and delivering material fed thereto;

a housing around said shaft and said rotor, said housing providing a tapered bearing surface for sealingly engaging said rotor;

bearing means in said housing for supporting said shaft spaced from said rotor;

a material inlet through said housing leading to the path of said cavity when revolving;

a material outlet through said housing leading from said path and spaced circumferentially from said material inlet;

a cap affixed to one end of said housing;

biasing means carried by said cap for applying force to one end of said rotor to hold said rotor in sealing engagement with said tapered bearing surface;

passage means in said cap communicating between the interior of said housing and the exterior of said cap via said biasing means interposed in said passage means; and means in fluid flow communication between said passage means and a source of circulating flushing fluid whereby the fluid from said source flow therethrough and through said passage means via said biasing means into the interior of said housing so as to prevent the entrance of foreign matter into and the accumulation of foreign matter in the interior of said housing and said biasing means.

10. A feeder in accordance with claim 9 wherein said biasing means is characterized further to include:

a plunger slidingly disposed within said passage means for longitudinal movement coaxial with the axis of rotation of said rotor; and spring means engaging said plunger and continuously biasing said plunger into contact with said rotor to thereby hold said rotor in sealing engagement with said tapered bearing surface.

11. A feeder in accordance with claim 9 wherein said fluid is a liquid hydrocarbon.

12. A feeder in accordance with claim 9 wherein said fluid is a mineral oil.

13. A feeder in accordance with claim 9 wherein said passage means includes an internally threaded portion and said biasing means comprises:

a tubular outer member having external threads and a longitudinal passage therethrough, said longitudinal passage being defined by a central generally cylindrical portion with a radially inwardly extending shoulder adjacent one end of the outer member and an internally threaded portion adjacent the opposite end of the outer member;

a plunger slidingly disposed within said longitudinal passage with one end of said plunger extending beyond said one end of said outer member for applying force to one end of said rotor and with the opposite end of said plunger disposed within the generally cylindrical portion of said longitudinal passage and having a radially outwardly extending shoulder thereon for abuttingly engaging the radially inwardly extending shoulder of said longitudinal passage and thereby retaining said plunger within said longitudinal passage;

an externally threaded member threadedly engaged with the internally threaded portion of said longitudinal passage and having a port extending longitudinally therethrough; and compression coil spring means disposed within said longitudinal passage intermediate said plunger and said externally threaded member for biasing said plunger toward said one end of the outer member.

14. A method of controlling the passage of material through a structure of the type which includes valve body means defining a valve chamber having a frustoconically shaped bearing surface and having an inlet port and an outlet port each communicating between said valve chamber and the exterior of said valve body means; valve member means for controlling the passage of material through said valve body means, said valve member means having a frustoconically shaped outer surface, said valve member means being disposed within said valve chamber in close slidable sealing engagement therewith and being adapted to rotate about its longitudinal axis within said valve chamber; and biasing means carried by said valve body means for urging the frustoconically shaped outer surface of said valve member means into slidable sealing engagement with a frustoconically shaped bearing surface, said method comprising the steps of:

(a) passing a circulating flushing fluid through said biasing means into said valve chamber and between said valve member means and said bearing surface to the outlet port to prevent the entrance of foreign matter into and the accumulation of foreign matter in said valve chamber and said biasing means;

(b) supplying material to the inlet port of said valve body means; and (c) rotating said valve member means relative to said valve body means to block flow of material through said valve body means from said inlet port, and, alternately, to permit flow of material into said valve body means via said inlet port and out of said valve body means via said outlet port.

15. A method in accordance with claim 14 wherein said fluid passed in step (a) is a liquid lubricant.

16. A method in accordance with claim 14 wherein said fluid passed in step (a) is a mineral oil.

17. A method in accordance with claim 14 wherein said fluid passed in step (a) is a liquid hydrocarbon.

18. A method in accordance with claim 14 wherein said fluid passed in step (a) is selected from the group consisting of isobutane, isopentane, cyclohexane, and mixtures of any two or more thereof.

19. A method in accordance with claim 14 wherein said material is catalyst for use in a catalytic reaction.

20. A method of controlling the flow of catalyst to a catalytic reaction through a structure of the type which includes valve body means defining a valve chamber having a bearing surface and having an inlet port and an outlet port each communicating between said valve chamber and the exterior of said valve body means; valve member means for controlling the passage of catalyst through said valve body means, said valve member means having an outer surface and being disposed within said valve chamber with a portion of said outer surface in slidable sealing engagement with said bearing surface and being adapted to rotate about its longitudinal axis within said valve chamber; and biasing means carried by said valve body means for urging said valve member means into slidable sealing engagement with the bearing surface of said valve chamber, said method comprising the steps of:

(a) passing a circulating flushing fluid through said biasing means into said valve chamber and between said valve member means and said bearing surface to the outlet port to prevent the entrance of foreign matter into and the accumulation of foreign matter in said valve chamber and said biasing means;

(b) supplying catalyst to the inlet port of said valve body means; and (c) rotating said valve member means relative to said valve body means to block flow of catalyst through said valve body means from said inlet port, and, alternately, to permit flow of catalyst into said valve body means via said inlet port and out of said valve body means via said outlet port.

21. A method in accordance with claim 20 wherein said fluid passed in step (a) is a liquid lubricant.

22. A method in accordance with claim 20 wherein said fluid passed in step (a) is a liquid employed in the catalytic reaction.

23. A method in accordance with claim 20 wherein said fluid passed in step (a) is selected from the group consisting of isobutane, isopentane, cyclohexane, and mixtures of any two or more thereof.

* * * * *

UNITED STATES PATENT AND TRADEMARK OFFICE
CERTIFICATE OF CORRECTION

PATENT NO. : 4,501,286

DATED : February 26, 1985

INVENTOR(S) : Raymond G. Rohlfing, Laura A. Martin

It is certified that error appears in the above-identified patent and that said Letters Patent is hereby corrected as shown below:

The title page showing the illustrative should be deleted to appear as per attached page.

Signed and Sealed this

Twenty-first Day of June, 1988

Attest:

DONALD J. QUIGG

Attesting Officer

Commissioner of Patents and Trademarks

United States Patent

Rohlfing et al.

[11] Patent Number: 4,501,286
[45] Date of Patent: Feb. 26, 1985

[54] ROTARY VALVE

[75] Inventors: Raymond G. Rohlfing; Laura A. Martin, both of Bartlesville, Okla.

[73] Assignee: Phillips Petroleum Company, Bartlesville, Okla.

[21] Appl. No.: 459,298

[22] Filed: Jan. 20, 1983

[51] Int. Cl.³ .............................. F16K 5/22; B08B 3/04
[52] U.S. Cl. ............................... 137/15; 137/240; 137/246.22; 222/368; 406/63; 414/219
[58] Field of Search ............ 137/240, 15, 246, 246.22; 198/723; 222/368; 252/11; 406/63, 64, 65, 66, 67, 68; 414/219, 220

[56] References Cited

U.S. PATENT DOCUMENTS

| | | | |
|---|---|---|---|
| 1,696,726 | 12/1928 | Nordstrom | 137/246.22 |
| 2,278,819 | 4/1942 | Gredell | 299/34 |
| 2,885,246 | 5/1959 | De Haven | 406/68 |
| 3,139,996 | 7/1964 | Welty | 214/17 |
| 3,167,398 | 1/1965 | Whittington | 23/285 |
| 3,219,208 | 11/1965 | Hadley et al. | 214/17 |
| 3,559,678 | 2/1971 | Donner | 137/535 |
| 3,665,957 | 5/1972 | Fulmer et al. | 137/509 |
| 4,325,837 | 4/1982 | Capshew et al. | 252/429 B |

OTHER PUBLICATIONS

Operating and Maintenance Instructions AP-150 Double Check Feeder Valve, Seiscor Division, Seismograph Service Corporation.

Primary Examiner—George L. Walton
Attorney, Agent, or Firm—French and Doescher

[57] ABSTRACT

A valve structure including a valve body defining a valve chamber with a tapered bearing surface and a tapered valve member journaled in the tapered bearing surface. A spring-biased plunger mechanism constantly urges the valve member into slidable sealing engagement with the tapered bearing surface. A passage communicates between the valve chamber and the exterior of the valve body via the spring-biased plunger mechanism and is connected in fluid flow communication with a source of suitable fluid, whereby such fluid passes from the source into the valve chamber via the spring-biased plunger mechanism.

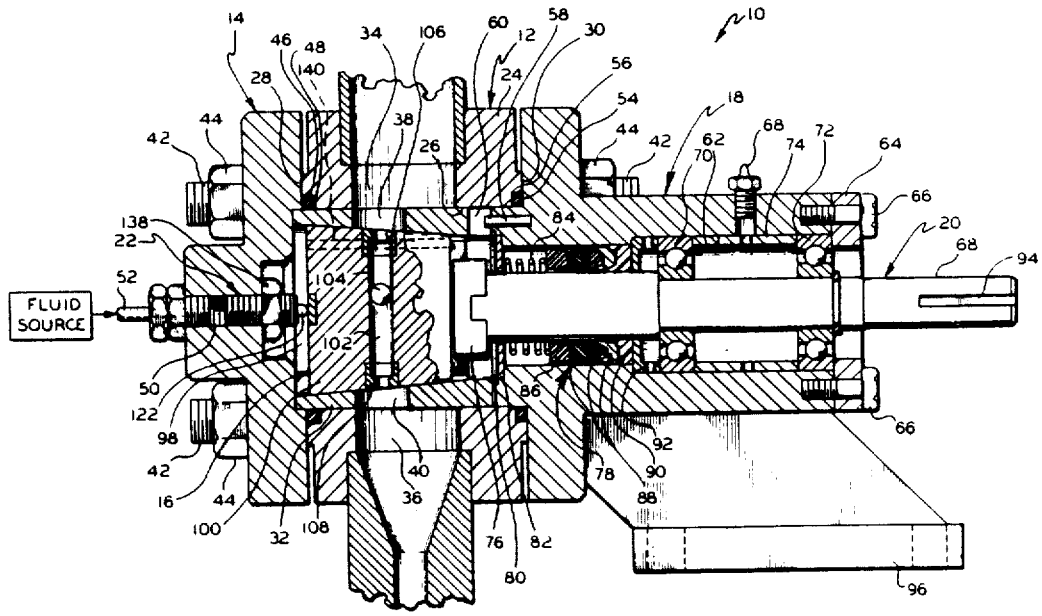

23 Claims, 2 Drawing Figures